(12) United States Patent
Chen et al.

(10) Patent No.: US 12,284,121 B2
(45) Date of Patent: Apr. 22, 2025

(54) SERVICE TRAFFIC ADJUSTMENT METHOD AND APPARATUS

(71) Applicant: Huawei Technologies Co., Ltd., Shenzhen (CN)

(72) Inventors: Lihao Chen, Beijing (CN); Jiayi Zhang, Beijing (CN); Tongtong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 17/738,757

(22) Filed: May 6, 2022

(65) Prior Publication Data

US 2022/0263765 A1 Aug. 18, 2022

Related U.S. Application Data

(63) Continuation of application No. PCT/CN2020/119911, filed on Oct. 9, 2020.

(30) Foreign Application Priority Data

Nov. 8, 2019 (CN) .......................... 201911088713.7

(51) Int. Cl.
*H04L 47/2491* (2022.01)
*H04L 45/02* (2022.01)
(Continued)

(52) U.S. Cl.
CPC .......... *H04L 47/2491* (2013.01); *H04L 45/02* (2013.01); *H04L 45/50* (2013.01); *H04L 47/2425* (2013.01); *H04L 47/2483* (2013.01)

(58) Field of Classification Search
CPC ..... H04L 47/2491; H04L 45/02; H04L 45/50; H04L 47/2425; H04L 47/2483;
(Continued)

(56) References Cited

U.S. PATENT DOCUMENTS 8,014,273 B1 * 9/2011 Barrett ................ H04L 41/0896
370/210
8,208,808 B2 * 6/2012 Bernstein ........... H04Q 11/0062
398/79
(Continued)

FOREIGN PATENT DOCUMENTS

CN 101198093 A 6/2008
CN 106330755 A 1/2017
(Continued)

OTHER PUBLICATIONS

IEEE Std 802.1Q, 2012 Edition—"Media Access Control (MAC) Bridges and Virtual Bridged Local Area Networks," 1782 pages.

*Primary Examiner* — Wutchung Chu
(74) *Attorney, Agent, or Firm* — Conley Rose, P.C.

(57) ABSTRACT

A service traffic adjustment method includes a first controller obtaining a first limit value of a traffic parameter and a second limit value of the traffic parameter. The first controller obtains a target value of the traffic parameter based on the first limit value of the traffic parameter, the second limit value of the traffic parameter, and configuration information of a forwarding device through which the service flow passes. The target value of the traffic parameter meets a delay requirement of the service flow, the target value falls within a range determined based on the first limit value of the traffic parameter and the second limit value of the traffic parameter, and the first limit value is not equal to the second limit value. The first controller sends the target value of the traffic parameter.

20 Claims, 7 Drawing Sheets

(51) Int. Cl.
*H04L 45/50* (2022.01)
*H04L 47/2425* (2022.01)
*H04L 47/2483* (2022.01)

(58) Field of Classification Search
CPC ..... H04L 47/2441; H04L 47/26; H04L 47/29; H04L 47/2416; H04L 47/283; H04L 47/28
See application file for complete search history.

(56) References Cited

U.S. PATENT DOCUMENTS

| | | | |
|---|---|---|---|
| 8,830,826 B2* | 9/2014 | Chen | H04L 45/22 |
| | | | 370/228 |
| 9,313,132 B1* | 4/2016 | Kugel | H04L 43/028 |
| 10,567,272 B2* | 2/2020 | Lan | H04L 45/16 |
| 2003/0185217 A1 | 10/2003 | Ganti et al. | |
| 2009/0147731 A1* | 6/2009 | Chion | H04L 47/2433 |
| | | | 370/328 |
| 2012/0182892 A1 | 7/2012 | Frazier et al. | |
| 2013/0219046 A1* | 8/2013 | Wetterwald | H04L 45/38 |
| | | | 709/224 |
| 2014/0126423 A1* | 5/2014 | Vasseur | H04L 45/48 |
| | | | 370/255 |
| 2016/0119089 A1* | 4/2016 | Zhang | H04L 43/0823 |
| | | | 370/328 |
| 2016/0218943 A1* | 7/2016 | Djukic | H04L 43/0894 |
| 2016/0218983 A1* | 7/2016 | Dao | H04L 47/30 |
| 2016/0344626 A1 | 11/2016 | Chen et al. | |
| 2017/0245184 A1* | 8/2017 | Nagesh Shetigar | H04J 11/00 |
| 2017/0264537 A1* | 9/2017 | Patil | H04L 45/566 |
| 2019/0007941 A1 | 1/2019 | Cavalcanti et al. | |
| 2019/0253339 A1 | 8/2019 | Mehmedagic | |
| 2019/0327636 A1* | 10/2019 | Dao | H04W 28/0268 |
| 2020/0084147 A1* | 3/2020 | Gandhi | H04L 41/40 |
| 2022/0150761 A1* | 5/2022 | Kim | H04W 24/10 |
| 2022/0263765 A1* | 8/2022 | Chen | H04L 47/29 |
| 2022/0407808 A1* | 12/2022 | Chen | H04L 47/2425 |
| 2023/0022414 A1* | 1/2023 | Kim | H04L 1/1896 |

FOREIGN PATENT DOCUMENTS

| | | |
|---|---|---|
| CN | 110024339 A | 7/2019 |
| JP | H06338918 A | 12/1994 |
| WO | 2018191109 A1 | 10/2018 |

* cited by examiner

Value of a first TLV field

| Max CIR |
| --- |
| Max CBS |
| Min frame size |
| Max frame size |
| Min CIR |
| Min CBS |
| Max_Min frame size |
| Min_Max frame size |

FIG. 3

Value of a traffic specification TLV field

| Max CIR |
| --- |
| Max CBS |
| Min frame size |
| Max frame size |
| TSpecLimitEnable |

Value of a TSpecLimitEnable TLV field

| Min CIR |
| --- |
| Min CBS |
| Max_Min frame size |
| Min_Max frame size |

FIG. 4

Value of a TspecAllowed TLV field

| Allowed CIR |
|---|
| Allowed CBS |
| Allowed Min frame size |
| Allowed Max frame size |

SERVICE TRAFFIC ADJUSTMENT METHOD AND APPARATUS

CROSS-REFERENCE TO RELATED APPLICATIONS

This is a continuation of International Patent Application No. PCT/CN2020/119911 filed on Oct. 9, 2020, which claims priority to Chinese Patent Application No. 201911088713.7 filed on Nov. 8, 2019. The disclosures of the aforementioned applications are hereby incorporated by reference in their entireties.

TECHNICAL FIELD

This disclosure relates to the communication field, and in particular, to a service traffic adjustment method and apparatus.

BACKGROUND

As technologies develop, users impose an increasingly high requirement on a low network delay, and a large quantity of researches on how to implement the low network delay are made for many types of networks. For example, Time-Sensitive Network (TSN) is a set of standards that are studied by the Institute of Electrical and Electronics Engineers (IEEE) 802.1 TSN Task Group. The series of standards mainly define a time-sensitive transmission mechanism over the Ethernet, and are derived from an IEEE 802.1Q virtual local area network. The time-sensitive networking especially emphasizes a deterministic delay, a low delay, and high availability of transmission. Application scenarios of the TSN are wide. The industry considers that a TSN-related technology is an important enabling technology for industrial automation, Industry 4.0, industrial Internet, and smart manufacturing. In the automotive industry, the TSN is an important enabling technology for an in-vehicle network to move towards Ethernet-based transformation. For a future transport network to transport fifth generation (5G) or transport a real-time service, for example, augmented reality (AR) or virtual reality (VR), the TSN is also an important enabling technology to ensure a deterministic upper bound of a transmission delay.

A network architecture of the time-sensitive networking includes a talker and a listener. The talker and the listener are connected through a forwarding device. Currently, a configuration of the forwarding device meets a service traffic transmission delay requirement between the talker and the listener, but there is a waste of network resources, and network usage efficiency is relatively low.

SUMMARY

Embodiments of this disclosure provide a service traffic adjustment method and apparatus, to reduce a network resource waste, and improve network usage efficiency.

According to a first aspect, an embodiment of this disclosure provides a service traffic adjustment method. The method may be applied to a first controller, and the first controller may be, for example, a software-defined networking (SDN) controller or a centralized network configuration (CNC) controller. The service traffic adjustment method includes the following steps. First, the first controller obtains a first limit value of a traffic parameter and a second limit value of the traffic parameter, where the traffic parameter is a parameter of traffic corresponding to a service flow. Then, the first controller obtains a target value of the traffic parameter based on the first limit value, the second limit value, and configuration information of a forwarding device through which the service flow passes. Finally, the first controller sends the target value, where the target value is used to adjust the traffic of the service flow sent by a transmit end.

Compared with that in a conventional-technology solution in which network resources are allocated based on an upper limit value of a traffic parameter, in this embodiment of this disclosure, the target value is obtained based on the first limit value and the second limit value. The target value falls within a range determined based on the first limit value and the second limit value, and the target value meets a delay requirement of the service flow. Therefore, a requirement on the network resources, for example, a requirement on a bandwidth of the forwarding device, can be reduced when the delay requirement is ensured, and network usage efficiency can be improved.

Optionally, that the first controller obtains a target value of the traffic parameter based on the first limit value, the second limit value, and configuration information of a forwarding device through which the service flow passes may be implemented by using the following steps: First, the first controller obtains a first value based on the first limit value and the second limit value, where the first value falls within the range determined based on the first limit value and the second limit value. Then, the first controller obtains a delay upper bound of the service flow from the transmit end to a receive end based on the first value and the configuration information of the forwarding device through which the service flow passes. A network calculus method may be used to calculate the delay upper bound of the service flow from the transmit end to the receive end. When the delay upper bound does not exceed a preset delay, the first controller determines the first value as the target value. According to the foregoing method, an objective of determining the target value can be achieved, to improve network usage efficiency.

In this embodiment of this disclosure, there may be a plurality of implementations in which the first controller obtains the first limit value and the second limit value.

In a first possible implementation, the first limit value and the second limit value may be carried in a same message. The first controller receives a first message sent by the transmit end or a second controller communicating with the transmit end, where the first message includes the first limit value and the second limit value.

In actual application, the first limit value and the second limit value may be carried in a same type-length-value (TLV) field of the first message, or may be carried in different TLV fields of the first message. The first message includes a first TLV field, and the first TLV field is used to carry the first limit value and the second limit value. Alternatively, the first message includes a first TLV field and a second TLV field, the first TLV field is used to carry the first limit value, and the second TLV field is used to carry the second limit value. Alternatively, the first message includes a first TLV field and a second TLV field, the first TLV field is used to carry a first indication and the first limit value, the second TLV field is used to carry the second limit value, and the first indication is used to indicate that the second TLV field includes the second limit value.

Optionally, the first message includes a Multiple Registration Protocol (MRP) data unit, and the MRP data unit includes the TLV field. Alternatively, the first message includes a Link-Local Registration Protocol (LRP) data unit, and the LRP data unit includes the TLV field. Alternatively, the first limit value and the second limit value are carried in the first message by using a Yet Another Next Generation (YANG) model data structure.

In a second possible implementation, the first limit value and the second limit value may be carried in different messages. The first controller obtains a second message and a third message, where the second message includes the first limit value, and the third message includes the second limit value. The first limit value may be carried in a TLV field of the second message, and the second limit value may be carried in a TLV field of the third message.

To identify that the first limit value in the second message and the second limit value in the third message belong to a same traffic parameter, optionally, the second message and the third message may carry an identifier of the traffic parameter. In addition, the second message and the third message may further carry an identifier of the service flow, to notify the first controller that the first limit value in the second message and the second limit value in the third message belong to a traffic parameter of a same service flow.

Optionally, the first controller may further send the target value to the forwarding device, and the target value is further used to adjust the configuration information of the forwarding device. In this embodiment of this disclosure, the forwarding device may include a shaper, configured to transmit the received service flow at a specific rate. In this case, the target value may be used as a new parameter of the shape, to update an original parameter of the shaper, so as to meet the delay requirement.

Optionally, when the first controller can directly communicate with the transmit end, the first controller may directly send the target value to the transmit end of the service flow. The first controller may send a fourth message to the transmit end of the service flow, where the fourth message includes the target value. For example, the target value may be carried in a TLV field of the fourth message. When the first controller cannot directly communicate with the transmit end, that is, the first controller needs to communicate with the transmit end through a second controller, the first controller may send the target value to the second controller, so that the second controller configures the transmit end of the service flow based on the target value. The first controller may send a fifth message to the second controller, where the fifth message includes the target value. For example, the target value may be carried in a TLV field of the fifth message.

According to a second aspect, an embodiment of this disclosure provides a service traffic adjustment method. The method may be applied to a transmit end, and the transmit end may be a source end of a service flow or an edge network device. The transmit end may directly communicate with a first controller. The method includes the following steps. First, the transmit end obtains a target value of a traffic parameter. The traffic parameter is a parameter of traffic corresponding to the service flow, the target value falls within a range determined based on a first limit value and a second limit value, and the target value meets a delay requirement of the service flow. Then, the transmit end adjusts the traffic of the service flow based on the target value. In this embodiment of this disclosure, the transmit end adjusts the traffic of the service flow based on the target value, so that the delay requirement is ensured, and wastes of resources of a forwarding device are reduced.

Optionally, when the transmit end can directly communicate with the first controller, the method may include the following step: The transmit end directly sends the first limit value and the second limit value to the first controller. When the transmit end needs to communicate with the first controller through the second controller, the method may include the following step: The transmit end sends the first limit value and the second limit value to the second controller, so that the first controller obtains the target value based on the first limit value and the second limit value.

In a possible implementation, the first limit value and the second limit value may be carried in a same message for sending. That the transmit end sends the first limit value and the second limit value to the first controller or the second controller includes: The transmit end sends a first message to the first controller or the second controller, where the first message includes the first limit value and the second limit value.

The first limit value and the second limit value may be in a same TLV field or different TLV fields of the first message.

The first message includes a first TLV field, and the first TLV field is used to carry the first limit value and the second limit value. Alternatively, the first message includes a first TLV field and a second TLV field, the first TLV field is used to carry the first limit value, and the second TLV field is used to carry the second limit value. Alternatively, the first message includes a first TLV field and a second TLV field, the first TLV field is used to carry a first indication and the first limit value, the second TLV field is used to carry the second limit value, and the first indication is used to indicate that the second TLV field includes the second limit value.

In another possible implementation, the first limit value and the second limit value may be separately carried in different messages for sending. That the transmit end sends the first limit value and the second limit value to the first controller includes: The transmit end sends a second message and a third message to the first controller, where the second message includes the first limit value, and the third message includes the second limit value.

For related details of the first message, the second message, and the third message, refer to embodiments of the specification. Details are not described herein again.

Correspondingly, the transmit end may obtain the target value in the following two manners. When the transmit end can directly communicate with the first controller, the transmit end may receive the target value sent by the first controller. For example, the transmit end may receive a fourth message sent by the first controller, where the fourth message includes the target value. When the transmit end needs to communicate with the first controller through the second controller, the transmit end obtains the target value based on a configuration of the second controller.

According to a third aspect, an embodiment of this disclosure further provides a service traffic adjustment method, and the method may be performed by a second controller. The second controller may be a CNC controller, a programmable logic controller (PLC), or the like. The method includes the following steps. First, the second controller obtains a first limit value of a traffic parameter and a second limit value of the traffic parameter, where the traffic parameter is a parameter of traffic corresponding to a service flow. Then, the second controller sends the first limit value and the second limit value to the first controller, so that the first controller obtains a target value of the traffic parameter based on the first limit value and the second limit value. Next, the second controller receives the target value from the first controller, where the target value falls within a range determined based on the first limit value and the second limit value, and the target value meets a delay requirement of the service flow. Finally, the second controller sends the target value to a transmit end of the service flow, where the target value is used to adjust the traffic of the service flow sent by the transmit end. In other words, in this embodiment of this disclosure, when the transmit end and the first controller are connected to each other through the second controller, the second controller may send the target value to the transmit end by using the foregoing method, to achieve an objective of reducing network resources.

In this embodiment of this disclosure, there may be a plurality of implementations in which the second controller sends the first limit value and the second limit value to the first controller.

In a possible implementation, the second controller sends a first message to the first controller, where the first message includes the first limit value and the second limit value of the traffic parameter.

The first limit value and the second limit value may be in a same TLV field or different TLV fields of the first message.

The first message includes a first TLV field, and the first TLV field is used to carry the first limit value and the second limit value. Alternatively, the first message includes a first TLV field and a second TLV field, the first TLV field is used to carry the first limit value, and the second TLV field is used to carry the second limit value. Alternatively, the first message includes a first TLV field and a second TLV field, the first TLV field is used to carry a first indication and the first limit value, the second TLV field is used to carry the second limit value, and the first indication is used to indicate that the second TLV field includes the second limit value.

In another possible implementation, the first limit value and the second limit value may be separately carried in different messages for sending. The second controller sends a second message and a third message to the first controller, where the second message includes the first limit value, and the third message includes the second limit value.

For related details of the first message, the second message, and the third message, refer to embodiments of the specification. Details are not described herein again.

According to a fourth aspect, an embodiment of this disclosure provides a service traffic adjustment apparatus. The apparatus is used in a first controller. The apparatus includes: an obtaining unit, configured to obtain a first limit value of a traffic parameter and a second limit value of the traffic parameter, where the traffic parameter is a parameter of traffic corresponding to a service flow; a determining unit, configured to obtain a target value of the traffic parameter based on the first limit value, the second limit value, and configuration information of a forwarding device through which the service flow passes, where the target value meets a delay requirement of the service flow, the target value falls within a range determined based on the first limit value and the second limit value, and the first limit value is not equal to the second limit value; and a sending unit, configured to send the target value, where the target value is used to adjust the traffic of the service flow sent by a transmit end.

Optionally, the determining unit is configured to: obtain a first value of the traffic parameter based on the first limit value and the second limit value, where the first value falls within the range determined based on the first limit value and the second limit value; obtain a delay upper bound of the service flow from the transmit end to a receive end based on the first value and the configuration information of the forwarding device through which the service flow passes; and determine the first value as the target value when the delay upper bound does not exceed a preset delay.

Optionally, the obtaining unit is configured to receive a first message sent by the transmit end or a second controller communicating with the transmit end, where the first message includes the first limit value and the second limit value.

Optionally, the first message includes a first TLV field, and the first TLV field is used to carry the first limit value and the second limit value. Alternatively, the first message includes a first TLV field and a second TLV field, the first TLV field is used to carry the first limit value, and the second TLV field is used to carry the second limit value. Alternatively, the first message includes a first TLV field and a second TLV field, the first TLV field is used to carry a first indication and the first limit value, the second TLV field is used to carry the second limit value, and the first indication is used to indicate that the second TLV field includes the second limit value.

Optionally, the obtaining unit is configured to obtain a second message and a third message, where the second message includes the first limit value, and the third message includes the second limit value.

Optionally, the sending unit is configured to send the target value to the transmit end of the service flow; or send the target value to the second controller, so that the second controller configures the transmit end of the service flow based on the target value.

Optionally, sending the target value to the transmit end of the service flow includes: sending fourth message to the transmit end of the service flow, where the fourth message includes the target value.

Optionally, sending the target value to the second controller includes: sending a fifth message to the second controller, where the fifth message includes the target value.

According to a fifth aspect, an embodiment of this disclosure provides a service traffic adjustment apparatus. The apparatus is used in a transmit end. The apparatus includes: a receiving unit, configured to obtain a target value of a traffic parameter, where the traffic parameter is a parameter of traffic corresponding to a service flow, the target value falls within a range determined based on a first limit value and a second limit value, the target value meets a delay requirement of the service flow, and the first limit value is not equal to the second limit value; and an adjustment unit, configured to adjust the traffic of the service flow based on the target value.

Optionally, the apparatus further includes: an obtaining unit, configured to obtain the first limit value and the second limit value; and a sending unit, configured to send the first limit value and the second limit value to a first controller or a second controller.

Optionally, the sending unit is configured to send a first message to the first controller or the second controller, where the first message includes the first limit value and the second limit value.

Optionally, the first message includes a first TLV field, and the first TLV field is used to carry the first limit value and the second limit value. Alternatively, the first message includes a first TLV field and a second TLV field, the first TLV field is used to carry the first limit value, and the second TLV field is used to carry the second limit value. Alternatively, the first message includes a first TLV field and a second TLV field, the first TLV field is used to carry a first indication and the first limit value, the second TLV field is used to carry the second limit value, and the first indication is used to indicate that the second TLV field includes the second limit value.

Optionally, the obtaining unit is configured to receive the target value sent by the first controller; or obtain the target value based on a configuration of the second controller.

Optionally, receiving the target value sent by the first controller includes: receiving a fourth message sent by the first controller, where the fourth message includes the target value.

According to a sixth aspect, an embodiment of this disclosure provides a service traffic adjustment apparatus, used in a second controller. The apparatus includes: an obtaining unit, configured to obtain a first limit value of a traffic parameter and a second limit value of the traffic parameter, where the traffic parameter is a parameter of traffic corresponding to a service flow; a first sending unit, configured to send the first limit value and the second limit value to a first controller; a receiving unit, configured to receive a target value, from the first controller, of the traffic parameter, where the target value falls within a range determined based on the first limit value and the second limit value, the first limit value is not equal to the second limit value, and the target value meets a delay requirement of the service flow; and a second sending unit, configured to send the target value to a transmit end of the service flow, where the target value is used to configure the transmit end of the service flow.

Optionally, the first sending unit is configured to send a first message to the first controller, where the first message includes the first limit value and the second limit value of the traffic parameter.

Optionally, the first message includes a first TLV field, and the first TLV field is used to carry the first limit value and the second limit value.

Alternatively, the first message includes a first TLV field and a second TLV field, the first TLV field is used to carry the first limit value, and the second TLV field is used to carry the second limit value.

Alternatively, the first message includes a first TLV field and a second TLV field, the first TLV field is used to carry a first indication and the first limit value, the second TLV field is used to carry the second limit value, and the first indication is used to indicate that the second TLV field includes the second limit value.

In the embodiments of the first aspect to the sixth aspect, the first limit value includes a maximum service traffic rate and a maximum burst volume, the second limit value includes a minimum service traffic rate and a minimum burst volume, and the target value includes a target service traffic rate and a target burst volume.

Optionally, the first limit value further includes a minimum value of a minimum packet length of the service flow, the second limit value further includes a maximum value of the minimum packet length of the service flow, and the target value further includes a target minimum length of the service flow.

Optionally, the first limit value further includes a maximum value of a maximum packet length of the service flow, the second limit value further includes a minimum value of the maximum packet length of the service flow, and the target value further includes a target maximum length of the service flow.

BRIEF DESCRIPTION OF DRAWINGS

FIG. 3 is a schematic diagram of a value in a first TLV field in a first message according to an embodiment of this disclosure;

FIG. 4 is a schematic diagram of values in a first TLV field and a second TLV field in a first message according to an embodiment of this disclosure;

DESCRIPTION OF EMBODIMENTS

In a network architecture of time-sensitive networking, a talker and a listener are connected through a forwarding device. To meet a packet transmission delay from the talker to the listener, a controller of the forwarding device obtains a maximum service traffic transmission requirement of the talker for sending a service flow, calculates configuration information of the forwarding device on a path from the talker to the listener based on the maximum service traffic transmission requirement of the talker, and delivers the configuration information of the forwarding device to each forwarding device on the path. However, because an actual service traffic transmission requirement of the talker may be lower than the maximum service traffic transmission requirement, calculating the configuration information of the forwarding device based on the maximum service traffic transmission requirement may result in a network resource waste and low network usage efficiency. For example, the maximum service traffic transmission requirement obtained by the controller of the forwarding device may be an upper limit value of a traffic parameter of the service flow sent by the talker. The upper limit value of the traffic parameter is, for example, a maximum quantity of packets sent per unit of time, a maximum quantity of bytes of each packet, or the like. To be specific, a configuration of the forwarding device needs to meet a condition that an actual delay of arrival at the listener does not exceed a delay upper bound when the traffic parameter of the service flow is the upper limit value. However, an actual value of the traffic parameter of the service flow may be less than the upper limit value, or a probability of reaching the upper bound is low. Therefore, configuring the forwarding device by using the upper bound results in a network resource waste and low network usage efficiency.

To resolve the foregoing technical problems, embodiments of this disclosure provide a service traffic adjustment method and apparatus, to reduce network resources, and improve network usage efficiency.

The following describes the service traffic adjustment method and apparatus provided in the embodiments of this disclosure by using an application scenario as an example.

Figure 1:
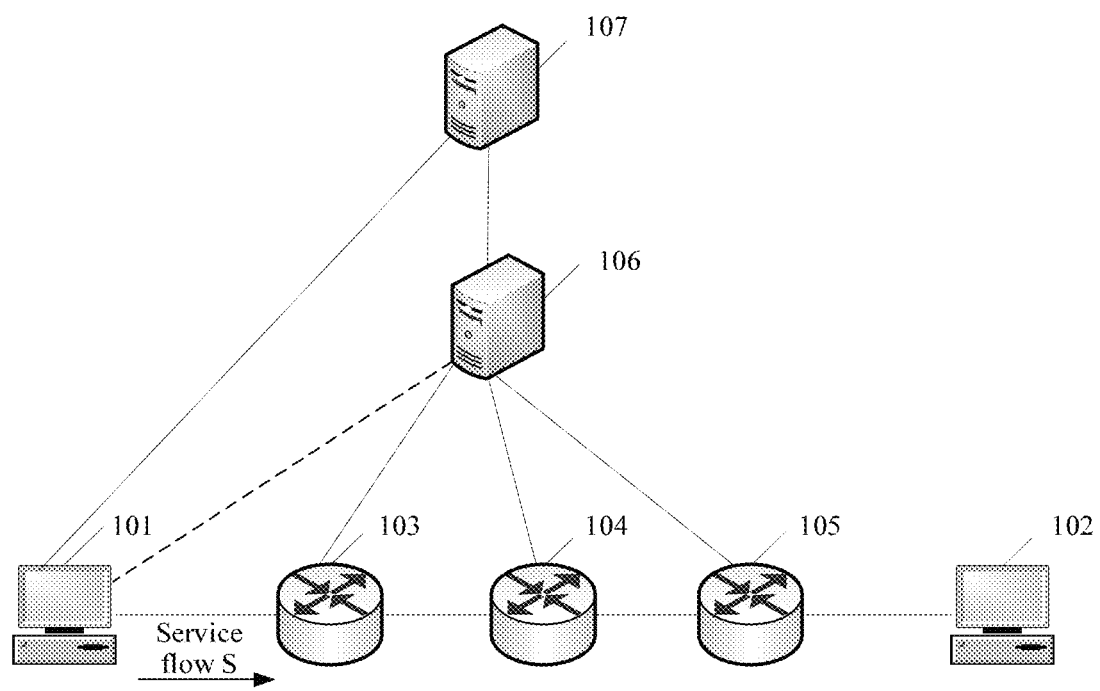
FIG. 1 is a schematic diagram of a service traffic adjustment system according to an embodiment of this disclosure.

FIG. 1 is a schematic diagram of a service traffic adjustment system according to an embodiment of this disclosure.

In FIG. 1, the service traffic adjustment system includes a transmit end 101, a receive end 102, a forwarding device 103, a forwarding device 104, a forwarding device 105, and a controller 106. The transmit end 101 is connected to the forwarding device 103, and the forwarding device 103 is connected to the forwarding device 104. The forwarding device 104 is connected to the forwarding device 105, and the forwarding device 105 is connected to the receive end 102. The controller 106 is separately connected to the forwarding device 103, the forwarding device 104, and the forwarding device 105.

In this embodiment of this of disclosure, the transmit end may be a talker in time-sensitive networking, and the receive end may be a listener in the time-sensitive networking. In addition, in this embodiment of this disclosure, the transmit end 101 may alternatively be a source end of a service flow S or an edge network device. The receive end 102 may alternatively be a destination end of the service flow S or an edge network device. The transmit end 101 and the receive end 102 each may be a terminal device, a forwarding device, or a server. When the transmit end 101 and the receive end 102 each are a terminal device, the transmit end 101 and the receive end 102 each may be a desktop computer, a mobile phone, a tablet computer, a notebook computer, a palmtop computer, a mobile Internet device (MID), a wearable device, a VR device, an AR device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. When the transmit end 101 and the receive end 102 each are a forwarding device, the transmit end 101 and the receive end 102 each may be a device, for example, a switch or a router.

The forwarding device 103, the forwarding device 104, and the forwarding device 105 that are connected between the transmit end 101 and the receive end 102 each may be a device, for example, a switch or a router, and are configured to transmit the service flow S sent by the transmit end 101 to the receive end 102. In actual application, there may be more than three or less than three forwarding devices that are connected between the transmit end 101 and the receive end 102. In this embodiment of this disclosure, the foregoing three forwarding devices are used as examples for description.

The controller 106 may be an SDN controller, a CNC controller, or the like. The controller 106 and the transmit end 101 may be connected to each other directly (shown by dashed lines in the figure) or indirectly. If the controller 106 and the transmit end 101 are connected to each other indirectly, the service traffic adjustment system may further include a controller 107, and the transmit end 101 is connected to the controller 106 through the controller 107. The controller 107 may be a CNC controller, a PLC, or the like.

The service traffic adjustment system shown in FIG. 1 is merely an example of this disclosure, and constitutes no limitation on the technical solutions of this disclosure. The following uses two solutions in which the transmit end 101 and the controller 106 in FIG. 1 are connected to each other directly and indirectly as examples to separately describe the service traffic adjustment method provided in the embodiments of this disclosure.

An example in which the transmit end 101 and the controller 106 in FIG. 1 are connected to each other directly is first used to describe the service traffic adjustment method provided in the embodiments of this disclosure.

Figure 2:
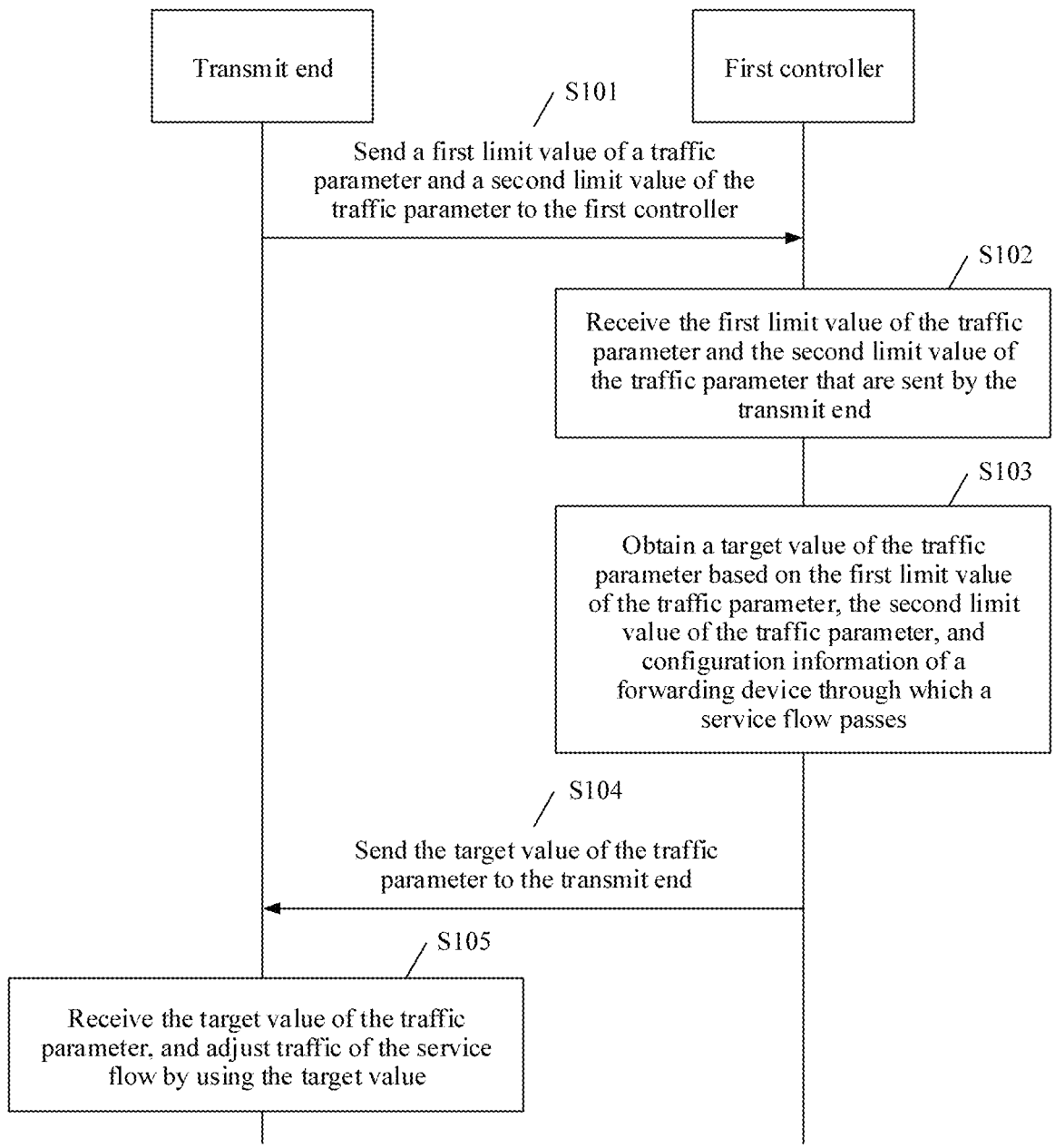
FIG. 2 is a schematic flowchart of a service traffic adjustment method according to an embodiment of this disclosure.

FIG. 2 is a schematic flowchart of a service traffic adjustment method according to an embodiment of this disclosure.

S101: A transmit end sends a first limit value of a traffic parameter and a second limit value of the traffic parameter to a first controller.

In this embodiment of this disclosure, the transmit end may directly communicate with the first controller. The transmit end may be the transmit end 101 in FIG. 1, and the first controller may be the controller 106 in FIG. 1. An interface through which the first controller and the transmit end are connected may be a user-network interface (UNI).

In this embodiment of this disclosure, the traffic parameter is a parameter of service traffic corresponding to a service flow, limit values of the traffic parameter include the first limit value of the traffic parameter and the second limit value of the traffic parameter, and the first limit value is not equal to the second limit value.

In this embodiment of this disclosure, the traffic parameter may include a service traffic rate and a burst volume. The service traffic rate refers to an average rate of the service flow. When the service flow is sent by using a token bucket, the service flow rate is, for example, a committed information rate (CIR). The burst volume refers to burst traffic of the service flow. When the service flow is sent by using the token bucket, the burst volume is, for example, a committed burst size (CBS). This embodiment of this disclosure is not limited to a manner of sending the service traffic by using the token bucket.

Correspondingly, the first limit value includes a maximum service traffic rate and a maximum burst volume, and the second limit value includes a minimum service traffic rate and a minimum burst volume. For example, the maximum service traffic rate being 2,000 bits per second (bits/s) means that the transmit end expects that a network can meet an end-to-end delay requirement when the service traffic rate of the service flow reaches a maximum value 2,000 bits/s. The minimum service traffic rate being 500 bits/s means that the transmit end expects that the network can meet the end-to-end delay requirement at least when a provided service traffic rate of the service flow is a minimum value 500 bits/s. For another example, the maximum burst volume being 800 bits means that the transmit end expects that a network can meet an end-to-end delay requirement when the burst volume of the service flow reaches a maximum value 800 bits. The minimum burst volume being 300 bits means that the transmit end expects that the network can meet the end-to-end delay requirement at least when a provided burst volume of the service flow is a minimum value 300 bits.

Optionally, the traffic parameter may further include a minimum packet length of the service flow. Correspondingly, the first limit value further includes a minimum value of the minimum packet length of the service flow, and the second limit value further includes a maximum value of the minimum packet length of the service flow. For example, the maximum value of the minimum packet length being 1,000 bits means that the transmit end can ensure that all packets of the service flow are not shorter than 1,000 bits, but cannot ensure that all the packets are not shorter than a value that is greater than the maximum value of the minimum packet length, for example, 1,001 bits. The minimum value of the minimum packet length being 200 bits means that the transmit end can ensure that all the packets of the service flow are not shorter than 200 bits.

Optionally, the traffic parameter may further include a maximum packet length of the service flow. Correspondingly, the first limit value further includes a maximum value of the maximum packet length of the service flow, and the second limit value further includes a minimum value of the maximum packet length of the service flow. For example, the maximum value of the maximum packet length being 8,000 bits means that the transmit end can ensure that all the packets of the service flow are not longer than 8,000 bits. The minimum value of the maximum packet length being 5,000 bits means that the transmit end can ensure that all the packets of the service flow are not longer than 5,000 bits, but cannot ensure that all the packets are not longer than a value that is less than the minimum value of the maximum packet length, for example, 4,999 bits.

It may be understood that types of parameters included in the first limit value and the second limit value constitute no limitation on the technical solutions of this disclosure, and persons skilled in the art may design the types based on a specific situation.

In this embodiment of this disclosure, the transmit end may send a first message to the first controller, and the first message includes the first limit value and the second limit value. The first limit value and the second limit value may be carried in a same TLV field or two TLV fields of the first message. The first limit value and the second limit value are carried in a first TLV field of the first message. Alternatively, the first limit value is carried in a first TLV field of the first message, and the second limit value is carried in a second TLV field of the first message. If the first limit value is carried in the first TLV field of the first message, and the second limit value is carried in the second TLV field of the first message, the first TLV field may further include a first indication, and the first indication is used to indicate that the second TLV field includes the second limit value.

A value of the first TLV field shown in FIG. 3 may carry the first limit value and the second limit value. The maximum service traffic rate included in the first limit value may be carried by using a maximum committed information rate (Max CIR) field in FIG. 3. The maximum burst volume included in the first limit value may be carried by using a maximum committed burst size (Max CBS) field in FIG. 3. The maximum value of the maximum packet length included in the first limit value may be carried by using a maximum frame size (Max Frame Size) field in FIG. 3. The minimum value of the minimum packet length included in the first limit value may be carried by using a minimum frame size (Min Frame Size) field in FIG. 3. The minimum service traffic rate included in the second limit value may be carried by using a minimum committed information rate (Min CIR) field in FIG. 3. The minimum burst volume included in the second limit value may be carried by using a minimum committed burst size (Min CBS) field in FIG. 3. The maximum value of the minimum packet length included in the second limit value may be carried by using a maximum value of a minimum frame length (Max_Min Frame Size) field in FIG. 3. The minimum value of the maximum packet length included in the second limit value may be carried by using a minimum value of a maximum frame length (Min_Max Frame Size) field in FIG. 3.

For example, the first TLV field may be a traffic specification (TSPEC) TLV field shown in FIG. 4, and a value of the traffic specification TLV field is used to carry the first limit value. The second TLV field may be a traffic specification limit enable (TSPEC Limit Enable) TLV field shown in FIG. 4, and a value of the TSPEC limit enable TLV field is used to carry the second limit value. For parameters included in the first limit value and the second limit value and a manner of carrying the first limit value and the second value, refer to related descriptions in FIG. 3. As shown in FIG. 4, the value of the traffic specification TLV field further includes a TSPEC limit enable field. A value carried by the TSPEC limit enable field being 1 indicates that the TSPEC limit enable TLV field exists. A value carried by the TSPEC limit enable field being 0 indicates that the TSPEC limit enable TLV field does not exist. TSPEC may alternatively be represented as TSpec or tspec. This is not limited in this embodiment of this disclosure.

If the first message complies with a MRP, the first message includes an MRP data unit (MRPDU), and the foregoing TLV field may be carried in the MRP data unit.

If the first message complies with a LRP, the first message includes an LRP data unit (LRPDU), and the foregoing TLV field may be carried in the LRP data unit.

If the first message complies with a Representation State Transfer Configuration Protocol (RESTCONF), the first limit value and the second limit value of the traffic parameter may be carried in the first message by using a YANG model data structure.

Certainly, it may be understood that the manner of carrying the first limit value and the second limit value constitute no limitation on the technical solutions of this disclosure, and persons skilled in the art may set the manner based on an actual situation.

For example, the first limit value and the second limit value may be sent in two messages. To be specific, the first device sends a second message and a third message to the first controller, the second message includes the first limit value of the traffic parameter, and the third message includes the second limit value of the traffic parameter. A specific manner of carrying the first limit value of the traffic parameter and the second limit value of the traffic parameter in the second message and the third message is similar to a manner of carrying the first limit value and the second limit value in the first message. Details are not described herein again.

In this embodiment of this disclosure, the transmit end may further send a delay requirement of the service flow to the first controller. The delay requirement of the service flow is a delay requirement that needs to be met by the service flow from the transmit end (for example, the transmit end 101) to a receive end (for example, the receive end 102). The delay requirement may not exceed a preset delay.

The first message, the second message, and the third message may further carry the delay requirement of the service flow. The delay requirement may be in a same TLV field as the first limit value and the second limit value, or in a different TLV field, for example, carried in a user-network interface requirement TLV field.

S102: The first controller receives the first limit value of the traffic parameter and the second limit value of the traffic parameter that are sent by the transmit end.

For example, when the first limit value and the second limit value are carried in the first message, the first controller obtains the first limit value and the second limit value from the first message. When the limit values of the traffic parameter are carried in the first TLV field of the first message, the first controller obtains the first limit value and the second limit value of the traffic parameter from the first TLV field of the first message. When the first limit value of the traffic parameter is carried in the second TLV field of the first message, and the second limit value of the traffic parameter is carried in a third TLV field of the first message, the first controller reads the first limit value of the traffic parameter from the second TLV field of the first message, and reads the second limit value of the traffic parameter from the third TLV field of the first message. When the second TLV field includes the first indication, the first controller reads the second limit value of the traffic parameter from the third TLV field of the first message based on the first indication.

S103: The first controller obtains a target value of the traffic parameter based on the first limit value of the traffic parameter, the second limit value of the traffic parameter, and configuration information of a forwarding device through which the service flow passes.

In this embodiment of this disclosure, the target value falls within a range determined based on the first limit value and the second limit value, and the first limit value is not equal to the second limit value. In an implementation, the target value is greater than or equal to the first limit value and less than or equal to the second limit value, and the first limit value is less than the second limit value. In another implementation, the target value is greater than or equal to the second limit value and less than or equal to the first limit value, and the first limit value is greater than the second limit value. A value of a parameter mentioned in this embodiment of this disclosure falling within a range means that the value of the parameter is greater than or equal to a lower limit value of the range and less than or equal to an upper limit value of the range. In this way, when the transmit end sends the service flow by using the target value as a maximum value, the delay requirement of the service flow is met.

For example, when the first limit value includes the maximum service traffic rate and the maximum burst volume, and the second limit value includes the minimum service traffic rate and the minimum burst volume, the target value includes the target service traffic rate and the target burst volume. The target service traffic rate falls within a range of [the minimum service traffic rate, the maximum service traffic rate], and the target burst volume falls within a range [the minimum burst volume, the maximum burst volume]. When the first limit value further includes the minimum value of the minimum packet length of the service flow, and the second limit value further includes the maximum value of the minimum packet length of the service flow, the target value further includes a target minimum length of the service flow, and the target minimum length falls within a range [the minimum value of the minimum packet length, the maximum value of the minimum packet length]. When the first limit value further includes the maximum value of the maximum packet length of the service flow, and the second limit value further includes the minimum value of the maximum packet length of the service flow, the target value further includes a target maximum length of the service flow, and the target maximum length falls within a range [the minimum value of the maximum packet length, the maximum value of the maximum packet length].

In this embodiment of this disclosure, S103 may be implemented by using the following steps.

First, the first controller obtains a first value of the traffic parameter based on the first limit value and the second limit value. The first value falls within the range determined based on the first limit value and the second limit value, and the first limit value is not equal to the second limit value. When the first limit value is greater than the second limit value, the first value is greater than or equal to the second limit value and less than or equal to the first limit value. When the second limit value is greater than the first limit value, the first value is greater than or equal to the first limit value and less than or equal to the second limit value. For example, the maximum service traffic rate is 2,000 bits/s, the minimum service traffic rate is 500 bits/s, and a first value of the service traffic rate may be 1,500 bits/s. The maximum burst volume is 800 bits, the minimum burst volume is 300 bits, and a first value of the burst volume may be 600 bits.

Figures 5, 6:
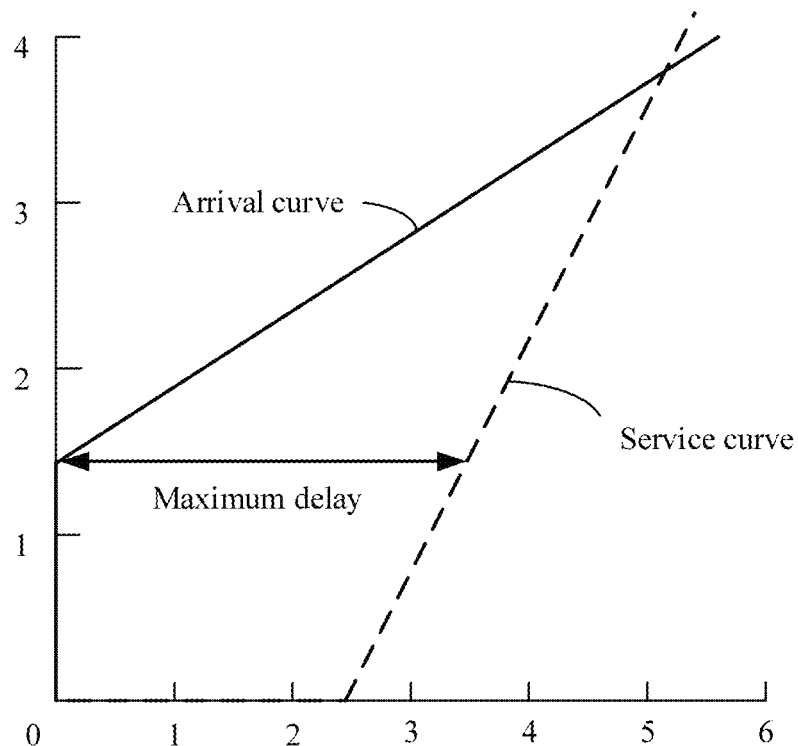
FIG. 5 is a schematic diagram of a service curve and an arrival curve according to an embodiment of this disclosure.
FIG. 6 is a schematic diagram of a value in a TLV field in a fourth message according to an embodiment of this disclosure.

Then, the first controller obtains a delay upper bound of the service flow from the transmit end to the receive end based on the first value and the configuration information of the forwarding device through which the service flow passes. In this embodiment of this disclosure, the configuration information of the forwarding device, for example, information such as a transmission rate of a port of the forwarding device, is used to calculate the delay upper bound of the service flow from the transmit end to the receive end. A network calculus method may be used to calculate the delay upper bound of the service flow from the transmit end to the receive end. The network calculus method is a method that can be used to calculate an end-to-end deterministic delay upper bound (DB) for a communication network. An upper bound of traffic of a service flow input by a forwarding device within any time period T is described as an arrival curve. A lower bound of a forwarding capability of the forwarding device within any time period T is abstracted as a service curve. It is assumed that a service flow in a network successively passes through M forwarding devices. Curves $\alpha_n(t)$ and $\beta_n(t)$ respectively represent an arrival curve and a service curve at an $n^{th}$ node in the M forwarding devices, where $1 \leq n \leq M$, $M \geq 1$, t represents any moment within the time period T, and $0 < t \leq T$. A maximum horizontal distance between the service curve and the arrival curve at the $n^{th}$ node within the time period T is a delay upper bound of the service flow sent by the forwarding device, as shown in FIG. 5.

An example in which the service flow S is transmitted from the transmit end 101 to the receive end 102 in the service traffic adjustment system shown in FIG. 1 is used to describe a method for calculating an end-to-end delay upper bound based on network calculus. After being sent from the transmit end 101, the service flow S successively passes through the forwarding device 103, the forwarding device 104, and the forwarding device 105. An arrival curve of the service flow S arriving at the forwarding device 103 is $\alpha_1(t)$, and a lower bound of a forwarding capability that can be provided by the forwarding device 103 is a service curve $\beta_1(t)$. An arrival curve of the service flow S arriving at the forwarding device 104 is $\alpha_2(t)$, and a lower bound of a forwarding capability that can be provided by the forwarding device 104 is a service curve $\beta_2(t)$. An arrival curve of the service flow S arriving at the forwarding device 105 is $\alpha_3(t)$, and a lower bound of a forwarding capability that can be provided by the forwarding device 105 is a service curve $\beta_3(t)$.

In this embodiment of this disclosure, an arrival curve at the forwarding device is $\alpha_n(t) = rt + b$, where a slope r is the first value of the service traffic rate, and an intercept b is the first value of the burst volume.

FIG. 1 is used as an example. Slopes r of the arrival curves at the forwarding device 103, the forwarding device 104, and the forwarding device 105 are all a first value of a service traffic rate of the service flow S, and intercepts b are all a first value of a burst volume of the service flow S.

A service curve at the forwarding device is $\beta_n(t) = Rt - B$, where a slope R may be equal to a difference between a transmission rate of the port of the forwarding device and a service traffic rate of an interference flow A. The interference flow A is a service flow whose priority is higher than that of the service flow S, and the interference flow A and the service flow S are output from a same port of a same forwarding device. An intercept B of the service curve may be equal to a sum of a burst volume of an interference flow B and a packet length of the interference flow B. The interference flow B is a service flow whose priority is lower than that of the service flow S, and the interference flow B and the service flow S are output from a same port of a same forwarding device.

The forwarding device 103 in FIG. 1 is used as an example. A slope R of the service curve $\beta_n(t)$ of the forwarding device 103 is equal to a difference between a transmission rate of a port of the forwarding device 103 and the service traffic rate of the interference flow A. The interference flow A is a service flow whose priority is higher than that of the service flow S, and the interference flow A and the service flow S are output from the same port of the forwarding device 103. The intercept B of the service curve $\beta_n(t)$ of the forwarding device 103 may be equal to the sum of the burst volume of the interference flow B and the packet length of the interference flow B. The interference flow B is a service flow whose priority is lower than that of the service flow S, and the interference flow B and the service flow S are output from the same port of the forwarding device 103.

It can be learned from FIG. 1 that the slope R of the service curve $\beta_n(t)$ is greater than the slope r of the arrival curve $\alpha_n(t)$.

The foregoing method for calculating the service curve $\beta_n(t)$ constitutes no limitation on the technical solutions of this disclosure. Persons skilled in the art may further design the method based on a specific situation. For example, calculation may further be performed based on a transmission delay of the service flow in the forwarding device.

There is a plurality of methods for obtaining the end-to-end delay upper bound of the service flow through calculation by using a network calculus principle, for example, a separate flow analysis (SFA) method, a pay multiplexing only once (PMOO) analysis method, and a total flow analysis (TFA) method. Manners of calculating an arrival curve $\alpha_n(t)$ and/or a service curve $\beta_n(t)$ at each forwarding device in different methods may be different. Manners of calculating the end-to-end delay upper bound of the service flow by using the arrival curve and the service curve may also be different in the different methods. The example in which the service flow S is transmitted from the transmit end 101 to the receive end 102 in the service traffic adjustment system shown in FIG. 1 is still used. At least the following two methods may be used to calculate an end-to-end delay upper bound of the service flow S.

Manner 1: An overall arrival curve $\alpha(t)$ and an overall service curve $\beta(t)$ of an end-to-end service flow flowing through all N (N≥1) forwarding devices are separately calculated, and a maximum horizontal distance between $\alpha(t)$ and $\beta(t)$ is calculated, to determine a delay upper bound DB of the end-to-end service flow.

In this manner, an end-to-end service flow is directly used as an object. An arrival curve (t) of the service flow is expressed as an arrival curve $\alpha_1(t)$ at a first forwarding device in the network, this is, $\alpha(t)=\alpha_1(t)$. A service curve (t) of the end-to-end service flow is obtained by performing a mini-plus convolution operation on service curves $\beta_n(t)$ (n=1, 2, ..., and N) at all the forwarding devices in the network.

A formula for calculating mini-plus convolution between service curves at any two forwarding devices is first defined as follows:

$$\beta_{f,g}(t)=(\beta_f \otimes \beta_g)(t)=\inf\_\{0 \leq s \leq t\}(\beta_f((t-s))+\beta_g(s)) \quad \text{formula (1.1)}$$

All s∈[0, t] is traversed at any specified moment t, to solve an infimum value of $\beta_f((t-s))+\beta_g(s)$, and the obtained infimum value is used as a return result of the min-plus convolution operation $(\beta_f \otimes \beta_g)(t)$ at the moment t. (t) and $\beta(t)$ represent service curve functions of any two forwarding devices $\beta_f$ and $\beta_g$. The function is a non-decreasing function, s is an intermediate variable, and may be any value in [0, t], and inf represents calculating an infimum. For example, inf_{E}(x(E)) represents calculating an infimum of a function x(E) whose value is in a set E.

Based on the formula 1.1, for the service flow flowing through the N forwarding devices in the system, service curves at the forwarding devices are respectively $\beta_1(t)$, $\beta_2(t)$, ..., and $\beta_N(t)$. A formula for calculating the end-to-end service curve $\beta(t)$ of the service flow is as follows:

$$\beta_{1,2}(t)=(\beta_1 \otimes \beta_2)(t)=\inf\_\{0 \leq s \leq t\}(\beta_1(t-s)+\beta_2(s))$$

$$\beta_{1,2,3}(t)=(\beta_{1,2} \otimes \beta_3)(t)=\inf\_\{0 \leq s \leq t\}(\beta_{1,2}(t-s)+\beta_3(s)) \ldots$$

$$\beta(t)=\beta_{1,2,\ldots,N}(t)=(\beta_{1,2\ldots(N-1)} \otimes \beta_N)(t)=\inf\_\{0 \leq s \leq t\}(\beta_{1,2\ldots(N-1)}(t-s)+\beta_N(s)). \quad \text{formula (1.2)}$$

For example, for the service flow S based on the system shown in FIG. 1, an arrival curve of the service flow S is $\alpha(t)=\alpha_1(t)$, and a service curve of the service flow S is $\beta(t)=(\beta_{1,2} \otimes \beta_3)(t)=\inf\_\{0 \leq s \leq t\}(\beta_{1,2}(t-s)+\beta_3(s))$, where $\beta_{1,2}(t)=(\beta_1 \otimes \beta_2)(t)=\inf\_\{0 \leq s \leq t\}(\beta_1(t-s)+\beta_2(s))$.

A maximum horizontal distance between (t) and (t) is calculated to obtain the delay upper bound of the service flow, that is, DB=Max_Hdis($\alpha(t),\beta(t)$). Max_Hdis($\alpha(t),\beta(t)$) represents the maximum horizontal distance between $\alpha(t)$ and $\beta(t)$.

Manner 2: Arrival curves $\alpha_n(t)$ and service curves $\beta_n(t)$ at all N (N≥1) forwarding devices through which an end-to-end service flow flows are separately calculated, and a maximum horizontal distance between the corresponding $\alpha_n(t)$ and $\beta_n(t)$ is calculated, to determine delay upper bounds $db_n$=Max_Hdis($\alpha_n(t),\beta_n(t)$) of the service flow at all the forwarding devices. Summation is performed on the delay upper bounds $db_n$ at all the forwarding devices, to obtain the delay upper bound DB=SUM($db_1$, ..., and $db_n$) of the end-to-end service flow through calculation, where n=1, 2, ..., and N.

For example, for the service flow S, the arrival curve and the service curve of the service flow S at the forwarding device 103 are respectively $\alpha_1(t)$ and $\beta_1(t)$, and the arrival curve and the service curve of the service flow S at the forwarding device 104 are respectively $\alpha_2(t)$ and $\beta_2(t)$. In this case, a delay upper bound $db_1$=Max_Hdis($\alpha_1(t),\beta_1(t)$) of the service flow S at the forwarding device 103, a delay upper bound $db_2$=Max_Hdis($\alpha_2(t),\beta_2(t)$) at the forwarding device 104, and a delay upper bound $db_3$=Max_Hdis($\alpha_3(t),\beta_3(t)$) at the forwarding device 105 are separately calculated. Based on this, an end-to-end delay upper bound of the service flow S is obtained through calculation as follows: DB=db1+db2+db3.

It should be noted that, if the receive end has a capability of forwarding the service flow, for example, the receive end is an edge forwarding device connecting two adjacent domains, when the end-to-end delay upper bound of the service flow is calculated, an arrival curve and a service curve at the receive end further need to be considered. FIG. 1 is used as an example. An arrival curve of the service flow S at the receive end 102 is 4 $\alpha_4(t)$, and a lower bound of a forwarding capability that can be provided by the receive end 102 is a service curve $\beta_4(t)$.

For Manner 1, the end-to-end service curve is $\beta(t) = \beta_{1,2,3,4}(t) = (\beta_{1,2,3} \otimes \beta_4)(t) = \inf\_\{0 \leq s \leq t\}(\beta_{1,2,3}(t-s) + \beta_4(s))$, the end-to-end arrival curve is $\alpha(t) = \alpha_1(t)$, and the end-to-end delay upper bound is $DB = \text{Max\_Hdis}(\alpha(t), \beta(t))$.

For Manner 2, the end-to-end delay upper bound is $DB = db_1 + db_2 + db_3 + db_4$, where $db_4 = \text{Max\_Hdis}(\alpha_4(t), \beta_4(t))$.

In this embodiment of this disclosure, after obtaining the delay upper bound of the service flow from the transmit end to the receive end based on the first value of the traffic parameter and the configuration information of the forwarding device through which the service flow passes, the first controller may determine whether the delay upper bound does not exceed the preset delay. If the delay upper bound does not exceed the preset delay, the first controller determines the first value of the traffic parameter as the target value of the traffic parameter.

It may be understood that the foregoing manner of calculating the end-to-end delay upper bound constitutes no limitation on the technical solutions of this disclosure, and persons skilled in the art may design the manner based on an actual situation.

S104: The first controller sends the target value of the traffic parameter to the transmit end.

In this embodiment of this disclosure, the first controller may send a fourth message to the transmit end, where the fourth message carries the target value.

Optionally, the target value of the traffic parameter may be carried in a TLV field of the fourth message. Alternatively, the target value of the traffic parameter is carried in the fourth message by using a YANG model data structure.

For example, the target value may be carried in a value of a traffic specification allowed (TspecAllowed) TLV field shown in FIG. 6. A parameter that is related to the service traffic rate and that is included in the target value may be carried in an allowed committed information rate (Allowed CIR) field shown in FIG. 6. A parameter that is related to the burst volume and that is included in the target value may be carried in an allowed committed burst size (Allowed CBS) field shown in FIG. 6. A parameter that is related to the minimum packet length and that is included in the target value may be carried in an allowed minimum frame size (Allowed Min Frame Size) field shown in FIG. 6. A parameter that is related to a maximum packet length and that is included in the target value may be carried in an allowed maximum frame size (Allowed Max Frame Size) field shown in FIG. 6.

S105: The transmit end receives the target value of the traffic parameter, and adjusts the traffic of the service flow by using the target value.

For example, the transmit end adjusts the traffic of the service flow by using the target value as a maximum value.

In this embodiment of this disclosure, the traffic parameter of the service flow sent by the transmit end does not exceed the target value, and a configuration of the forwarding device can ensure the end-to-end delay requirement of the service flow. If the traffic parameter exceeds the target value, the configuration of the forwarding device cannot ensure the delay requirement.

Because the target value is less than the first limit value, compared with that in the conventional manner, the forwarding device does not need to allocate more bandwidth to the service flow. Therefore, network resources are reduced.

In this embodiment of this disclosure, after obtaining the target value of the traffic parameter, optionally, the first controller may further send the target value of the traffic parameter to the forwarding device. The target value of the traffic parameter is used to adjust the configuration information of the forwarding device, for example, a port rate of the forwarding device.

In a possible implementation, the forwarding device includes a shaper, configured to transmit the received service flow at a specific rate. In this case, the target value of the traffic parameter, for example, the target service traffic rate and the target burst volume, may be used as a new parameter of the shaper, to update an original parameter of the shaper, so as to meet the delay requirement.

In this embodiment of this disclosure, the first controller may obtain the target value through calculation based on the first limit value and the second limit value, and the target value not only falls into the range determined based on the first limit value and the second limit value, but also can meet the delay requirement. Therefore, when the transmit end sends the service flow by using the target value as the maximum value, not only the delay requirement can be met, but also bandwidths allocated by the forwarding device to the service flow can be reduced, so that network resources are reduced, and network usage efficiency is improved.

The following uses an example in which the transmit end 101 is connected to the controller 106 through the controller 107 in FIG. 1 to describe the service traffic adjustment method provided in the embodiments of this disclosure.

Figure 7:
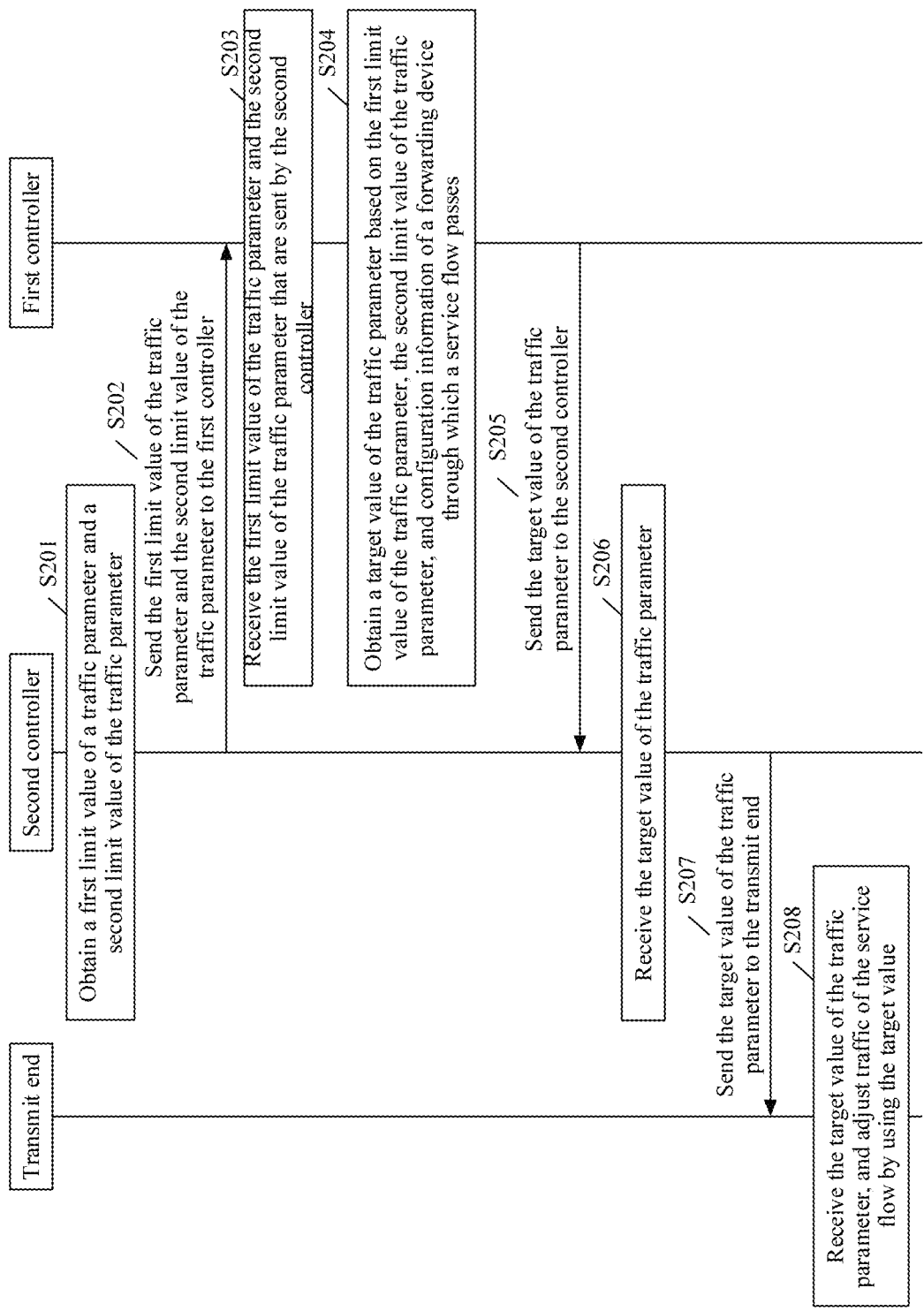
FIG. 7 is another schematic flowchart of a service traffic adjustment method according to an embodiment of this disclosure.

FIG. 7 is a schematic flowchart of a service traffic adjustment method according to an embodiment of this disclosure.

The following describes the service traffic adjustment method provided in the embodiments of this disclosure with reference to FIG. 1 and FIG. 7.

S201: A second controller obtains a first limit value of a traffic parameter and a second limit value of the traffic parameter.

In this embodiment of this disclosure, the second controller may be the controller 107. The traffic parameter is a parameter of traffic corresponding to a service flow. For content included in the traffic parameter, refer to the foregoing description. Details are not described herein again.

A manner in which the second controller obtains the first limit value of the traffic parameter and the second limit value of the traffic parameter may be that the second controller receives the first limit value of the traffic parameter and the second limit value of the traffic parameter that are sent by a transmit end, or the second controller obtains the first limit value of the traffic parameter and the second limit value of the traffic parameter that are preconfigured. This is not limited in this disclosure.

Optionally, the second controller may further obtain a delay requirement of the service flow. An obtaining manner is similar to the manner of obtaining the first limit value and the second limit value. Details are not described herein again.

S202: The second controller sends the first limit value of the traffic parameter and the second limit value of the traffic parameter to a first controller.

A manner in which the second controller sends the first limit value of the traffic parameter and the second limit value of the traffic parameter to the first controller is basically the same as a manner in which the transmit end sends the first limit value of the traffic parameter and the second limit value of the traffic parameter to the first controller in the embodiment shown in FIG. 2. Refer to the foregoing description. Details are not described herein again.

If the second controller further obtains the delay requirement of the service flow, the second controller further sends the delay requirement of the service flow to the first controller.

S203: The first controller receives the first limit value of the traffic parameter and the second limit value of the traffic parameter that are sent by the second controller.

S204: The first controller obtains a target value of the traffic parameter based on the first limit value of the traffic parameter, the second limit value of the traffic parameter, and configuration information of a forwarding device through which the service flow passes.

S203 and S204 are basically the same as S102 and S103. For related content, refer to the foregoing description. Details are not described herein again.

S205: The first controller sends the target value of the traffic parameter to the second controller.

In this embodiment of this disclosure, the first controller may send a fifth message to the second controller, where the fifth message carries the target value of the traffic parameter.

The target value of the traffic parameter may be carried in a TLV field of the fifth message. Alternatively, the target value of the traffic parameter is carried in the fifth message by using a YANG model data structure.

S206: The second controller receives the target value of the traffic parameter from the first controller.

S207: The second controller sends the target value of the traffic parameter to the transmit end.

S208: The transmit end receives the target value of the traffic parameter, and adjusts the traffic of the service flow by using the target value.

In this embodiment of this disclosure, because the transmit end and the first controller are connected to each other indirectly, the second controller needs to send the target value of the traffic parameter to the transmit end, so that the transmit end can adjust the traffic of the service flow based on the target value, to reduce network resources. That the transmit end receives the target value of the traffic parameter may be that the transmit end obtains the target value of the traffic parameter based on a configuration of the second controller.

In addition, the target value of the traffic parameter is further used to adjust the configuration information of the forwarding device. For related content, refer to the foregoing description. Details are not described herein again.

Figure 8:
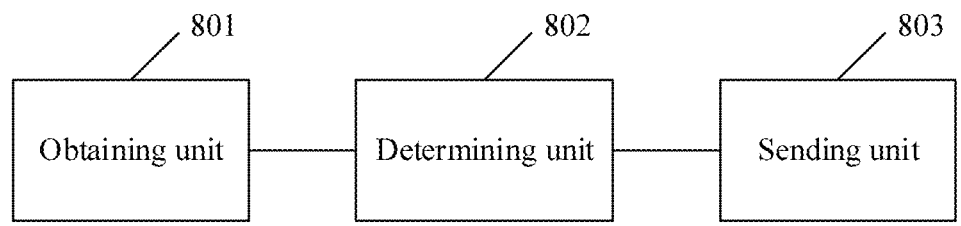
FIG. 8 is a block diagram of a structure of a service traffic adjustment apparatus according to an embodiment of this disclosure.

Correspondingly, refer to FIG. 8. An embodiment of this disclosure further provides a service traffic adjustment apparatus 800. The apparatus is used in a first controller, and the first controller may implement a function of the first controller in the embodiment shown in FIG. 2 or FIG. 7.

The apparatus 800 includes an obtaining unit 801, a determining unit 802, and a sending unit 803. The obtaining unit 801 may implement S102 in the embodiment shown in FIG. 2 or S203 in the embodiment shown in FIG. 7. The determining unit 802 may implement S103 in the embodiment shown in FIG. 2 or S204 in the embodiment shown in FIG. 7. The sending unit 803 may implement S104 in the embodiment shown in FIG. 2 or S205 in the embodiment shown in FIG. 7. Details are as follows:

The obtaining unit 801 is configured to obtain a first limit value of a traffic parameter and a second limit value of the traffic parameter, where the traffic parameter is a parameter of traffic corresponding to a service flow.

The determining unit 802 is configured to obtain a target value of the traffic parameter based on the first limit value of the traffic parameter, the second limit value of the traffic parameter, and configuration information of a forwarding device through which the service flow passes. The target value of the traffic parameter meets a delay requirement of the service flow, the target value falls within a range determined based on the first limit value and the second limit value, and the first limit value is not equal to the second limit value.

The sending unit 803 is configured to send the target value of the traffic parameter, where the target value is used to adjust the traffic of the service flow sent by a transmit end.

For specific content of the service traffic adjustment apparatus 800, refer to the description about the first controller in the foregoing method embodiments. Details are not described herein again.

Figure 9:
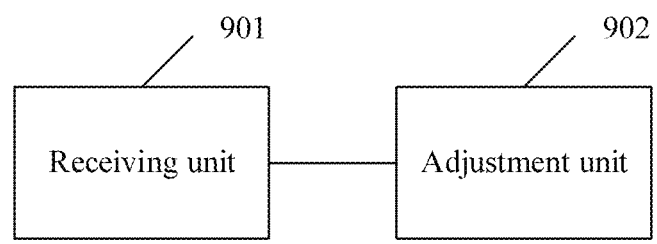
FIG. 9 is another block diagram of a structure of a service traffic adjustment apparatus according to an embodiment of this disclosure.

Refer to FIG. 9. An embodiment of this disclosure provides a service traffic adjustment apparatus 900. The apparatus is used in a transmit end, and the transmit end may implement a function of the transmit end in the embodiment shown in FIG. 2 or FIG. 7.

The service traffic adjustment apparatus 900 includes a receiving unit 901 and an adjustment unit 902. The receiving unit 901 and the adjustment unit 902 may implement a function of S105 in the embodiment shown in FIG. 2 or S207 in the embodiment shown in FIG. 7. Details are as follows:

The receiving unit 901 is configured to obtain a target value of a traffic parameter. The traffic parameter is a parameter of traffic corresponding to a service flow, and the target value falls within a range determined based on a first limit value and a second limit value. The target value meets a delay requirement of the service flow, and the first limit value is not equal to the second limit value.

The adjustment unit 902 is configured to adjust the traffic of the service flow based on the target value.

For specific content of the service traffic adjustment apparatus 900, refer to the description about the transmit end in the foregoing method embodiments. Details are not described herein again.

Figure 10:
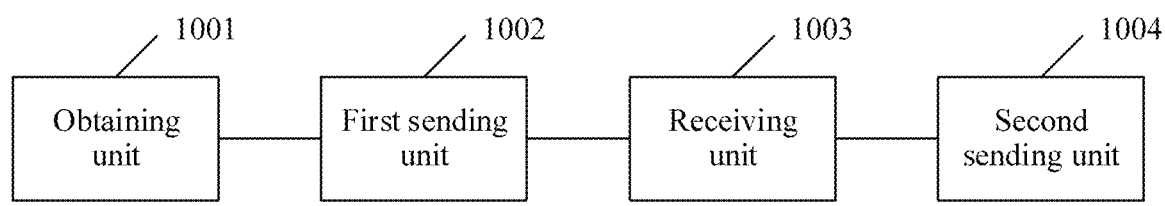
FIG. 10 is another block diagram of a structure of a service traffic adjustment apparatus according to an embodiment of this disclosure.

Refer to FIG. 10. An embodiment of this disclosure provides a service traffic adjustment apparatus 1000, applied to a second controller. The second controller may implement a function of the second controller in the embodiment shown in FIG. 2 or FIG. 7.

The service traffic adjustment apparatus 1000 includes an obtaining unit 1001, a first sending unit 1002, a receiving unit 1003, and a second sending unit 1004. The obtaining unit 1001 may implement a function of S201 in the embodiment shown in FIG. 7. The first sending unit 1002 may implement a function of S202 in the embodiment shown in FIG. 7. The receiving unit 1003 may implement a function of S206 in the embodiment shown in FIG. 7. The second sending unit 1004 may implement a function of S207 in the embodiment shown in FIG. 7. Details are as follows:

The obtaining unit 1001 is configured to obtain a first limit value of a traffic parameter and a second limit value of the traffic parameter, where the traffic parameter is a parameter of traffic corresponding to a service flow.

The first sending unit 1002 is configured to send the first limit value of the traffic parameter and the second limit value of the traffic parameter to a first controller.

The receiving unit 1003 is configured to receive a target value of the traffic parameter from the first controller. The target value falls within a range determined based on the first limit value and the second limit value, the first limit value is not equal to the second limit value, and the target value meets a delay requirement of the service flow.

The second sending unit 1004 is configured to send the target value of the traffic parameter to a transmit end of the service flow, where the target value is used to adjust the traffic of the service flow sent by the transmit end.

For specific content of the service traffic adjustment apparatus 1000, refer to the description about the second controller in the foregoing method embodiments. Details are not described herein again.

Correspondingly, an embodiment of this disclosure further provides a service traffic adjustment device corresponding to the service traffic adjustment apparatus 800. The service traffic adjustment device includes a processor and a memory. The memory is configured to store instructions, and the processor is configured to execute the instructions in the memory, to perform the service traffic adjustment method that is provided in the foregoing method embodiments and performed by the first controller.

Correspondingly, an embodiment of this disclosure further provides a service traffic adjustment device corresponding to the service traffic adjustment apparatus 900. The service traffic adjustment device includes a processor and a memory. The memory is configured to store instructions, and the processor is configured to execute the instructions in the memory, to perform the service traffic adjustment method that is provided in the foregoing method embodiments and performed by the transmit end.

Correspondingly, an embodiment of this disclosure further provides a service traffic adjustment device corresponding to the service traffic adjustment apparatus 1000. The service traffic adjustment device includes a processor and a memory. The memory is configured to store instructions, and the processor is configured to execute the instructions in the memory, to perform the service traffic adjustment method that is provided in the foregoing method embodiments and performed by the second controller.

Figure 11:
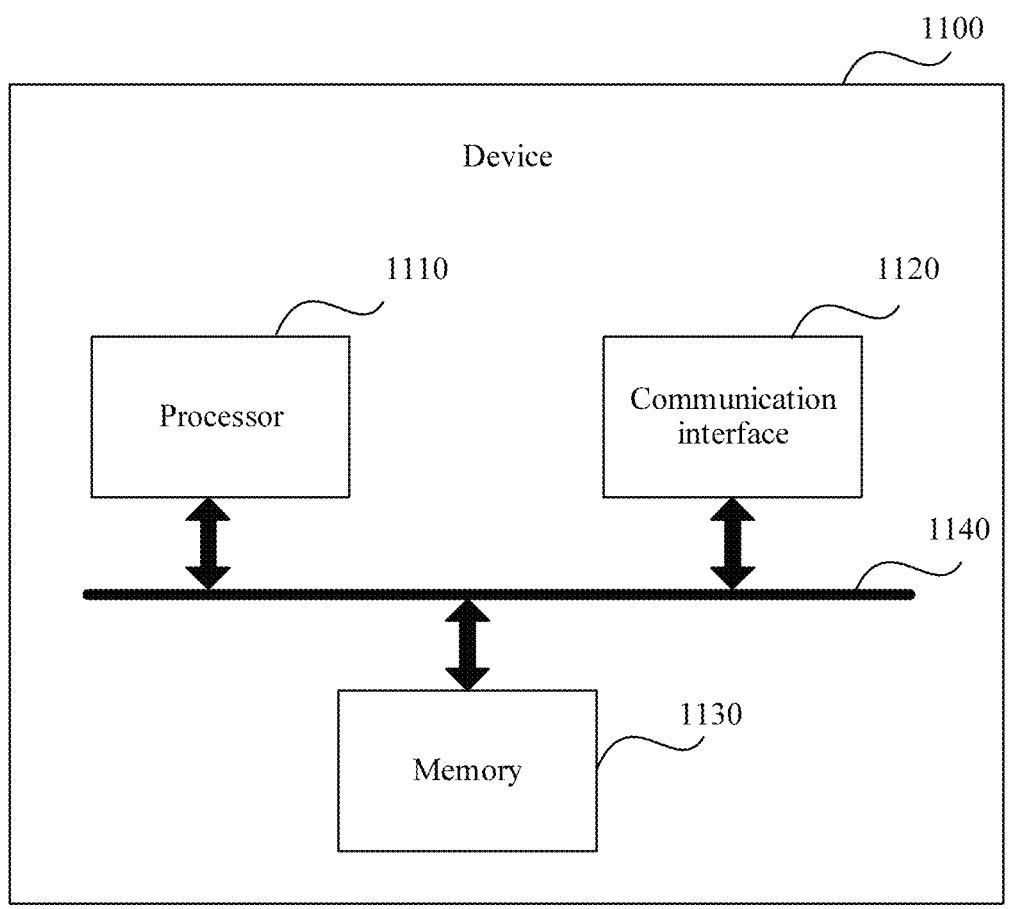
FIG. 11 is a schematic diagram of a structure of a service traffic adjustment device according to an embodiment of this disclosure.

It should be noted that hardware structures of the service traffic adjustment device corresponding to the service traffic adjustment apparatus 800, the service traffic adjustment device corresponding to the service traffic adjustment apparatus 900, and the service traffic adjustment device corresponding to the service traffic adjustment apparatus 1000 each may be a structure shown in FIG. 11. FIG. 11 is a schematic diagram of a structure of a device according to an embodiment of this disclosure.

Refer to FIG. 11. A device 1100 includes a processor 1110, a communication interface 1120, and a memory 1130. There may be one or more processors 1110 in the device 1100. In FIG. 11, one processor is used as an example. In this embodiment of this disclosure, the processor 1110, the communication interface 1120, and the memory 1130 may be connected through a bus system or in another manner. In FIG. 11, a connection through a bus system 1140 is used as an example.

The processor 1110 may be a central processing unit (CPU), a network processor (NP), or a combination of a CPU and an NP. The processor 1110 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1130 may include a volatile memory, for example, a random-access memory (RAM). The memory 1130 may further include a non-volatile memory, for example, a flash memory, a hard disk drive (HDD), or a solid-state drive (SSD). The memory 1130 may further include a combination of the foregoing types of memories.

Optionally, the memory 1130 stores an operating system, a program, an executable module or a data structure, a subset thereof, or an extended set thereof. The program may include various operation instructions, to implement various operations. The operating system may include various system programs, to implement various basic services and process hardware-based tasks. The processor 1110 may read the program in the memory 1130, to implement the service traffic adjustment method provided in the embodiments of this disclosure.

The bus system 1140 may be a Peripheral Component Interconnect (PCI) bus, an Extended Industry Standard Architecture (EISA) bus, or the like. The bus system 1140 may be classified into an address bus, a data bus, a control bus, and the like. For ease of representation, only one thick line is used to represent the bus system 1140 in FIG. 11, but this does not mean that there is only one bus or only one type of bus.

An embodiment of this disclosure further provides a service traffic adjustment system. The system includes a first controller and a transmit end. The first controller in the system may perform processing steps of the first controller in the embodiment shown in FIG. 2, or correspondingly, the first controller in the system is the service traffic adjustment apparatus 800 in the embodiment shown in FIG. 8. The transmit end in the system may perform the processing steps of the transmit end in the embodiment shown in FIG. 2, or correspondingly, the transmit end in the system is the service traffic adjustment apparatus 900 in the embodiment shown in FIG. 9.

An embodiment of this disclosure further provides a service traffic adjustment system. The system includes a first controller, a second controller, and a transmit end. The first controller in the system may perform processing steps of the first controller in the embodiment shown in FIG. 7, or correspondingly, the first controller in the system is the service traffic adjustment apparatus 800 in the embodiment shown in FIG. 8. The second controller in the system may perform processing steps of the second controller in the embodiment shown in FIG. 7, or correspondingly, the second controller in the system is the service traffic adjustment apparatus 1000 in the embodiment shown in FIG. 10. The transmit end in the system may perform the processing steps of the transmit end in the embodiment shown in FIG. 2, or correspondingly, the transmit end in the system is the service traffic adjustment apparatus 900 in the embodiment shown in FIG. 9.

An embodiment of this disclosure further provides a computer-readable storage medium, including instructions. When the instructions are run on a computer, the computer is enabled to perform the service traffic adjustment method that is provided in the foregoing method embodiments and performed by the first controller.

An embodiment of this disclosure further provides a computer-readable storage medium, including instructions. When the instructions are run on a computer, the computer is enabled to perform the service traffic adjustment method that is provided in the foregoing method embodiments and performed by the transmit end.

An embodiment of this disclosure further provides a computer-readable storage medium, including instructions. When the instructions are run on a computer, the computer is enabled to perform the service traffic adjustment method that is provided in the foregoing method embodiments and performed by the second controller.

An embodiment of this disclosure further provides a computer program product including instructions. When the computer program product runs on a computer, the computer is enabled to perform the service traffic adjustment method provided in the foregoing method embodiments and performed by the first controller.

An embodiment of this disclosure further provides a computer program product including instructions. When the computer program product runs on a computer, the computer is enabled to perform the service traffic adjustment method provided in the foregoing method embodiments and performed by the transmit end An embodiment of this disclosure further provides a computer program product including instructions. When the computer program product runs on a computer, the computer is enabled to perform the service traffic adjustment method provided in the foregoing method embodiments and performed by the second controller.

In the specification, claims, and accompanying drawings of this disclosure, the terms "first", "second", "third", "fourth", and the like (if existent) are intended to distinguish between similar objects but do not necessarily indicate a specific order or sequence. It should be understood that the data used in such a way are interchangeable in proper cases so that the embodiments described herein can be implemented in an order except the order illustrated or described herein. In addition, terms such as "comprise", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical module division. In an actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located at one position, or may be distributed on a plurality of network units. Some or all of the units may be obtained depending on an actual requirement to implement the objectives of the solutions in the embodiments.

In addition, module units in the embodiments of this disclosure may be integrated into one processing unit. Alternatively, each of the units may exist alone physically, or two or more units are integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium, and includes several instructions for instructing a computer device (which may be a personal computer, a server, a forwarding device, or the like) to perform all or some of the steps of the methods described in the embodiments of this disclosure. The storage medium includes any medium that can store program code, such as a USB flash drive, a removable hard disk, a read-only memory (ROM), a RAM, a magnetic disk, or an optical disc.

Persons skilled in the art should be aware that in the foregoing one or more examples, functions described in the present disclosure may be implemented by hardware, software, firmware, or any combination thereof. When software is used to implement the functions, the functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

In the foregoing specific implementations, the objectives, technical solutions, and beneficial effects are further described in detail. It should be understood that the foregoing descriptions are merely specific implementations.

The foregoing embodiments are merely intended to describe the technical solutions of this disclosure, but not to limit this disclosure. Although this disclosure is described in detail with reference to the foregoing embodiments, persons of ordinary skill in the art should understand that they may still make modifications to the technical solutions recorded in the foregoing embodiments or make equivalent replacements to some technical features thereof without departing from the scope of the technical solutions of the embodiments of this disclosure.

What is claimed is:

1. A method, comprising:
    obtaining a first limit value of a traffic parameter and a second limit value of the traffic parameter, wherein the traffic parameter corresponds to a service flow, wherein the first limit value comprises a maximum service traffic rate and a maximum burst volume, and wherein the second limit value comprises a minimum service traffic rate and a minimum burst volume;
    obtaining, based on the first limit value, the second limit value, and configuration information of a forwarding device through which the service flow passes, a target value of the traffic parameter, wherein the target value meets a delay requirement of the service flow, wherein the target value falls within a range that is based on the first limit value and the second limit value, wherein the first limit value is not equal to the second limit value, and wherein the target value comprises a target service traffic rate and a target burst volume; and
    sending the target value, wherein the target value is configured to adjust traffic from a transmit end of the service flow.

2. The method of claim 1, wherein obtaining the target value comprises:
obtaining, based on the first limit value and the second limit value, a first value of the traffic parameter, wherein the first value falls within the range;
obtaining, based on the first value and the configuration information, a delay upper bound of the service flow from the transmit end to a receive end; and
identifying the first value as the target value when the delay upper bound does not exceed a preset delay.

3. The method of claim 1, wherein obtaining the first limit value and the second limit value comprises receiving, from the transmit end or from a controller communicating with the transmit end, a first message, and wherein the first message comprises the first limit value and the second limit value.

4. The method of claim 3, wherein the first message comprises a first type-length-value (TLV) field that carries the first limit value and the second limit value, wherein the first message comprises the first TLV field that carries the first limit value and comprises a second TLV field that carries the second limit value, or wherein the first message comprises the first TLV field that carries a first indication and the first limit value and comprises the second TLV field that carries the second limit value, and wherein the first indication indicates that the second TLV field comprises the second limit value.

5. The method of claim 1, wherein obtaining the first limit value and the second limit value comprises obtaining a first message and a second message, wherein the first message comprises the first limit value, and wherein the second message comprises the second limit value.

6. The method of claim 1, wherein the first limit value further comprises a minimum value of a minimum packet length of the service flow, wherein the second limit value further comprises a maximum value of the minimum packet length of the service flow, and wherein the target value further comprises a target minimum length of the service flow.

7. The method of claim 1, wherein the first limit value further comprises a maximum value of a maximum packet length of the service flow, wherein the second limit value further comprises a minimum value of the maximum packet length of the service flow, and wherein the target value further comprises a target maximum length of the service flow.

8. The method of claim 1, wherein sending the target value comprises:
sending the target value to the transmit end of the service flow; or
sending the target value to a second controller to instruct the second controller to configure, based on the target value, the transmit end.

9. The method of claim 8, wherein sending the target value comprises sending a first message to the transmit end, and wherein the first message comprises the target value.

10. An apparatus, comprising:
a memory configured to store instructions; and
one or more processors coupled to the memory and configured to execute the instructions to:
obtain a first limit value of a traffic parameter and a second limit value of the traffic parameter, wherein the traffic parameter corresponds to a service flow, wherein the first limit value comprises a maximum service traffic rate and a maximum burst volume, and wherein the second limit value comprises a minimum service traffic rate and a minimum burst volume;
obtain, based on the first limit value, the second limit value, and configuration information of a forwarding device through which the service flow passes, a target value of the traffic parameter, wherein the target value meets a delay requirement of the service flow, wherein the target value falls within a range based on the first limit value and the second limit value, wherein the first limit value is not equal to the second limit value, and wherein the target value comprises a target service traffic rate and a target burst volume; and
send the target value, wherein the target value is configured to adjust traffic from a transmit end of the service flow.

11. The apparatus of claim 10, wherein the one or more processors are is further configured to execute the instructions to:
obtain, based on the first limit value and the second limit value, a first value of the traffic parameter, wherein the first value falls within the range based on the first limit value and the second limit value;
obtain, based on the first value and the configuration information, a delay upper bound of the service flow from the transmit end to a receive end; and
identify the first value as the target value when the delay upper bound does not exceed a preset delay.

12. The apparatus of claim 10, wherein the one or more processors are further configured to execute the instructions to receive a first message from the transmit end or from a controller communicating with the transmit end, and wherein the first message comprises the first limit value and the second limit value.

13. The apparatus of claim 12, wherein the first message comprises a first type-length-value (TLV) field that carries the first limit value and the second limit value, wherein the first message comprises the first TLV field that carries the first limit value and a second TLV field that carries the second limit value, or wherein the first message comprises the first TLV field that carries a first indication and the first limit value and the second TLV field that carries the second limit value, and wherein the first indication indicates that the second TLV field comprises the second limit value.

14. The apparatus of claim 10, wherein the one or more processors are further configured to execute the instructions to obtain a first message and a second message, wherein the first message comprises the first limit value, and wherein the second message comprises the second limit value.

15. The apparatus of claim 10, wherein the first limit value further comprises a minimum value of a minimum packet length of the service flow, wherein the second limit value further comprises a maximum value of the minimum packet length of the service flow, and wherein the target value further comprises a target minimum length of the service flow.

16. The apparatus of claim 10, wherein the first limit value further comprises a maximum value of a maximum packet length of the service flow, wherein the second limit value further comprises a minimum value of the maximum packet length of the service flow, and wherein the target value further comprises a target maximum length of the service flow.

17. The apparatus of claim 10, wherein the one or more processors are further configured to execute the instructions to:

send the target value to the transmit end; or send the target value to a controller to instruct the controller to configure, based on the target value, the transmit end.

18. The apparatus of claim 17, wherein the one or more processors are further configured to execute the instructions to send a first message to the transmit end of the service flow, and wherein the first message comprises the target value.

19. A computer program product comprising instructions that are stored on a non-transitory computer-readable storage medium and that, when execute by one or more processors, cause an apparatus to:

obtain a first limit value of a traffic parameter and a second limit value of the traffic parameter, wherein the traffic parameter corresponds to a service flow, wherein the first limit value comprises a maximum service traffic rate and a maximum burst volume, and wherein the second limit value comprises a minimum service traffic rate and a minimum burst volume;

obtain, based on the first limit value, the second limit value, and configuration information of a forwarding device through which the service flow passes, a target value of the traffic parameter, wherein the target value meets a delay requirement of the service flow, wherein the target value falls within a range based on the first limit value and the second limit value, wherein the first limit value is not equal to the second limit value, and wherein the target value comprises a target service traffic rate and a target burst volume; and send the target value, wherein the target value is configured to adjust traffic from a transmit end of the service flow.

20. The computer program product of claim 19, wherein the one or more processors are further configured to execute the instructions to cause the apparatus to:

obtain, based on the first limit value and the second limit value, a first value of the traffic parameter, wherein the first value falls within the range based on the first limit value and the second limit value;

obtain, based on the first value and the configuration information, a delay upper bound of the service flow from the transmit end to a receive end; and identify the first value as the target value when the delay upper bound does not exceed a preset delay.

* * * * *

UNITED STATES PATENT AND TRADEMARK OFFICE
CERTIFICATE OF CORRECTION

PATENT NO.        : 12,284,121 B2
APPLICATION NO.   : 17/738757
DATED             : April 22, 2025
INVENTOR(S)       : Lihao Chen, Jiayi Zhang and Tongtong Wang Page 1 of 1

It is certified that error appears in the above-identified patent and that said Letters Patent is hereby corrected as shown below:

In the Claims

Claim 8, Column 25, Line 53: "sending the target value to a second controller to instruct" should read "sending the target value to a controller to instruct"

Claim 8, Column 25, Line 54: "the second controller to configure, based on the target" should read "the controller to configure, based on the target"

Claim 11, Column 26, Line 19: "processors are is further configured to execute the instruc-" should read "processors are further configured to execute the instruc-"

Signed and Sealed this
Third Day of June, 2025

Coke Morgan Stewart
*Acting Director of the United States Patent and Trademark Office*